(12) United States Patent
Nakamura

(10) Patent No.: US 6,252,495 B1
(45) Date of Patent: Jun. 26, 2001

(54) SELECTOR DEVICE

(75) Inventor: Shigeki Nakamura, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/452,123

(22) Filed: Dec. 1, 1999

(30) Foreign Application Priority Data

Dec. 14, 1998 (JP) .................................. 10-354034

(51) Int. Cl.$^7$ ..................................................... G08B 3/00
(52) U.S. Cl. ...................... 340/328; 340/329; 340/825.44
(58) Field of Search ..................................... 340/326, 327, 340/328, 329, 384.3, 384.4, 384.5, 825.24, 825.25, 825.44; 707/104; 711/116, 161, 165

(56) References Cited

U.S. PATENT DOCUMENTS

| | | | |
|---|---|---|---|
| 4,486,853 | * 12/1984 | Parsons | 345/418 |
| 5,437,552 | * 8/1995 | Baer et al. | 434/317 |
| 5,481,595 | 1/1996 | Ohashi et al. | 379/67 |
| 5,531,600 | * 7/1996 | Baer et al. | 434/317 |
| 5,724,546 | * 3/1998 | Tsutsui | 711/116 |
| 5,857,200 | * 1/1999 | Togawa | 707/104 |
| 6,084,829 | * 7/2000 | Tsutsui | 369/7 |

FOREIGN PATENT DOCUMENTS

| | | |
|---|---|---|
| 0892534A2 | 1/1999 | (EP) . |
| WO 98/25393 | 6/1998 | (WO) . |

* cited by examiner

*Primary Examiner*—Van T. Trieu
(74) *Attorney, Agent, or Firm*—Fish & Richardson, PC

(57) ABSTRACT

A selector device which can select a target storage location only with a simple sound without visually confirming displayed contents. The selector device has a memory which can store stored information respectively at a plurality of storage locations. Specifying information for specifying a sound particular to each storage location can be stored in the memory. The storage locations are sequentially specified in an uniform order through manipulations on an UP key and a DOWN key, causing the sounds particular to the respective storage locations to be generated sequentially from a speaker. A storage location, at which a desired sound is generated, is decided through a manipulation on a decision input key.

32 Claims, 5 Drawing Sheets

FIG. 2

NUMERAL KEYS / FIRST DIGIT / SECOND DIGIT

| | 1 | 2 | 3 | 4 | 5 | 6 | 7 | 8 | 9 | 0 |
|---|---|---|---|---|---|---|---|---|---|---|
| 1 | ア | イ | ウ | エ | オ | ァ | ィ | ゥ | ェ | ォ |
| 2 | カ | キ | ク | ケ | コ | | | | | |
| 3 | サ | シ | ス | セ | ソ | | | | | |
| 4 | タ | チ | ツ | テ | ト | | | | | |
| 5 | ナ | ニ | ヌ | ネ | ノ | | | | | |
| 6 | ハ | ヒ | フ | ヘ | ホ | | | | | |
| 7 | マ | ミ | ム | メ | モ | | | | | |
| 8 | ヤ | ユ | ヨ | | | | | | | |
| 9 | ラ | リ | ル | レ | ロ | | | | | |
| 0 | ワ | ヲ | ン | | | | | | | |

FIG. 3

NUMERAL KEYS / FIRST DIGIT / SECOND DIGIT

| | 1 | 2 | 3 | 4 | 5 | 6 | 7 | 8 | 9 | 0 |
|---|---|---|---|---|---|---|---|---|---|---|
| 1 | A | B | C | D | E | a | b | c | d | e |
| 2 | F | G | H | I | J | f | g | h | i | j |
| 3 | K | L | M | N | O | k | l | m | n | o |
| 4 | P | Q | R | S | T | p | q | r | s | t |
| 5 | U | V | W | X | Y | u | v | w | x | y |
| 6 | Z | z | | | | | | | | |
| 7 | | | | | | | | | | |
| 8 | | | | | | | | | | |
| 9 | | | | | | | | | | |
| 0 | ( | ) | ¥ | & | * | # | ? | ! | 。 | 、 |

FIG. 4
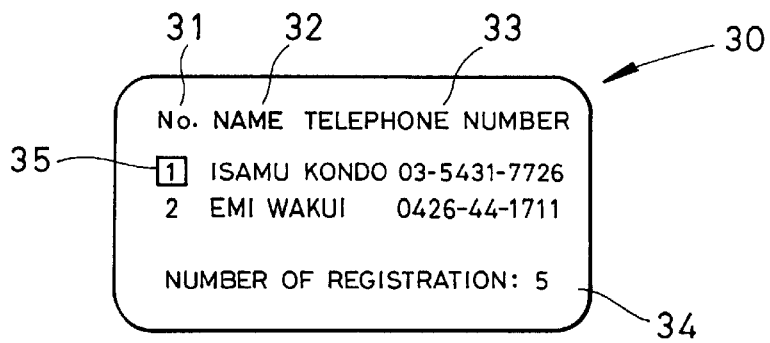
FIG. 5
| No. | GENERATED SOUND | NAME | TELEPHONE NUMBER |
|---|---|---|---|
| 1 | DO | ISAMU KONDO | 03-5431-7726 |
| 2 | RE | EMI WAKUI | 0426-44-1711 |
| 3 | MI | YUKI | 045-662-2884 |
| 4 | FA | | |
| 5 | SOL | OFFICE | 0467-46-4177 |
| 6 | LA | | |
| 7 | SI | | |
| 8 | DO | FRIEND | 03-3636-0041 |
| ⋮ | ⋮ | ⋮ | ⋮ |
| 14 | SI | | |
FIG. 6

SELECTOR DEVICE

BACKGROUND OF THE INVENTION

1. Field of the Invention

The present invention relates generally to a selector device for selecting one of destination numbers previously stored in a telephone, a facsimile or the like, and more particular to a selector device which allows the confirmation of a destination with a sound.

2. Description of Related Art

In recent years, telephones and facsimiles have experienced a remarkable pervasion. Particularly, PHS (Personal Handy phone System) terminals and portable telephones, which permit communications as one is walling or in a car, have become indispensable items among younger persons. For example, PHS terminals have a telephone directory function which can register several tens of telephone numbers of destinations. This telephone directory function conveniently allows the operator to directly place a call to a selected destination without pressing numeral keys only by manipulating a telephone directory key on the PHS terminal, sequentially scrolling telephone numbers of destinations displayed on a display device with UP/DOWN keys, a jog dial or the like, and manipulating a call key when the telephone number of the selected destination appears on the display device.

However, portable telephones and PHS terminals generally have a display device so small that a telephone number of a destination displayed thereon is difficult to view.

Some portable telephones or PHS terminals are provided with a function of audibly notifying the name and/or a telephone number of a selected destination in order to improve such defective operability. This function, however, requires an additional time for confirmation, and a complicated sound synthesizer which results in a higher cost.

OBJECT AND SUMMARY OF THE INVENTION

The present invention has been made in view of the problem mentioned above, and its object is to provide a selector device which is capable of selecting the position, at which a destination is stored, only through a simple sound without visually confirming the contents displayed on a display device.

To solve the above problem, according to a first aspect of the present invention, a selector device comprises a memory for storing stored information respectively at a plurality of storage locations thereof, and for storing specifying information for specifying a sound particular to each storage location; input means for specifying the storage locations in a uniform order; sound generating means for sequentially generating the sounds particular to the storage locations in the order in response to manipulations on the input means; and decision input means for deciding a storage location corresponding to the lastly generated sound.

According to a second aspect of the present invention, the selector device according to the first aspect further comprises reading means for reading stored information stored at the decided storage location for utilization.

A selector device according to a third aspect of the present invention is the selector device according to the first or second aspect which further comprises input means for registering new information at the decided storage location, or for updating or deleting stored information at the decided storage location.

A selector device according to a fourth aspect of the present invention is the selector device according to any of the first to third aspects, wherein each of the sounds generated in the uniform order forms a melody.

A selector device according to a fifth aspect of the present invention is the selector device according to any of the first to fourth aspects which further comprises display means for displaying or indicating at least a portion of the stored information together with the generation of the sound.

A selector device according to a sixth aspect of the present invention is the selector device according to any of the first to fifth aspects, wherein the storage locations can be specified backwardly by the input means.

The selector device of the present invention has a memory which can store respective stored information at a plurality of storage locations, thus enabling the storage of specifying information for specifying a sound particular to each storage location. The sound generating means is commanded to sequentially generate the sounds particular to respective storage locations in response to manipulations on the input means capable of specifying storage locations in a uniform order, and the decision input means is used to decide a storage location at which a desired sound is generated. In addition, the selector device may comprise reading means for reading stored information stored at a decided storage location for utilization, and input means for registering new information at a decided storage location or for updating or deleting stored information at a decided storage location.

Furthermore, the selector device can readily associate a sound with a storage location for facilitating the selection by assigning different melodies to respective sounds generated in an uniform order. The selector device may also comprise display means for displaying or indicating at least a portion of stored information to visually confirm the contents of the stored information, together with the confirmation with a generated sound. Moreover, the selector device may be configured to allow the operator to specify a storage location while scrolling the display backwardly with the input means to readily search for and decide a desired storage location.

BRIEF DESCRIPTION OF THE DRAWINGS

FIG. 2 is a table showing in a matrix form the relationship between numeral keys on a manipulation panel used for the selector device of the present invention and Japanese Kana characters;

FIG. 3 is another table showing in a matrix form the relationship between numeral keys on a manipulation panel used for the selector device of the present invention and English characters;

FIGS. 4 to 6 are diagrams showing the contents displayed on a display device which forms part of the selector device according to the present invention;

DESCRIPTION OF THE PREFERRED EMBODIMENTS

Figure 1:
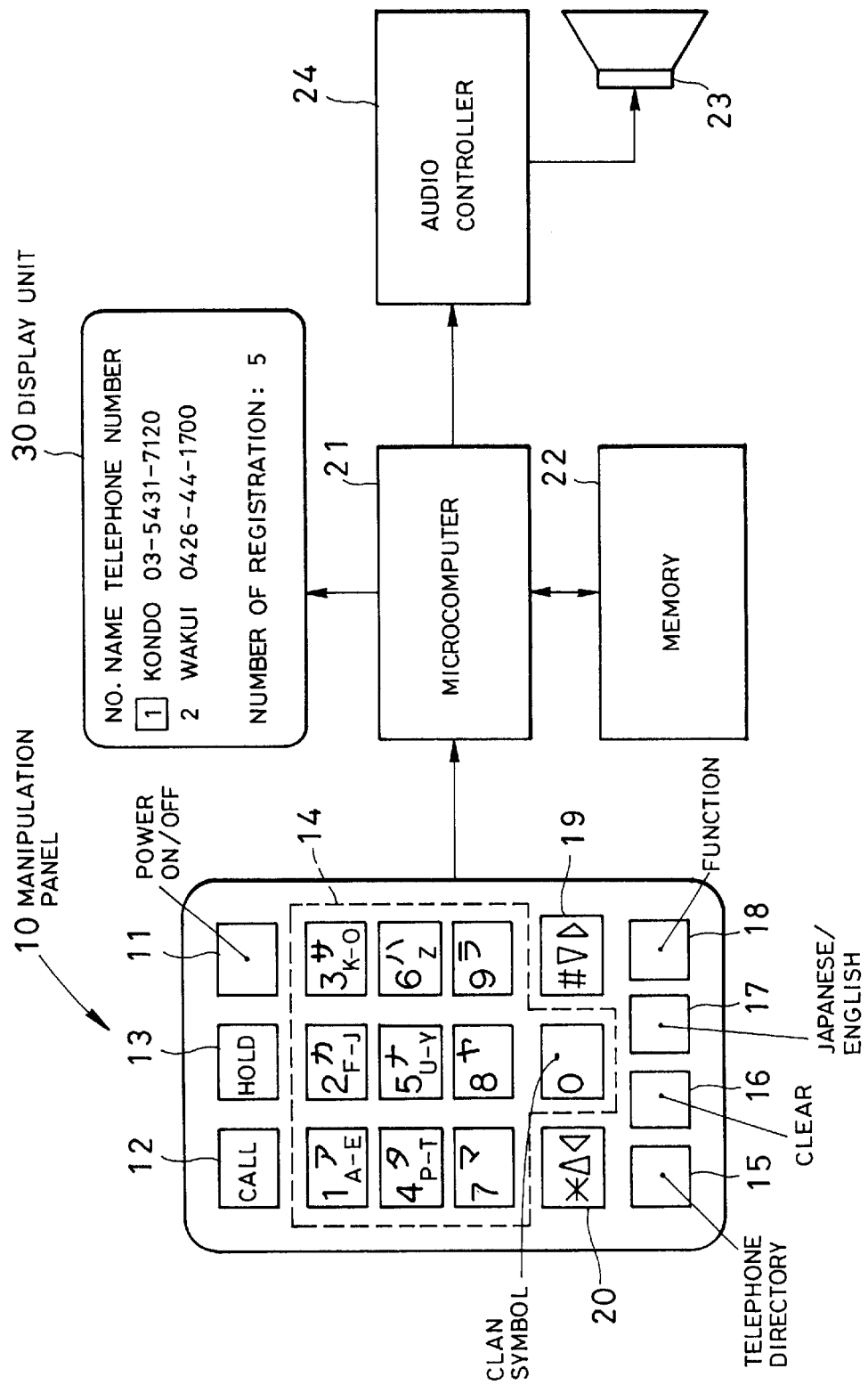
FIG. 1 is a block diagram illustrating a main portion of a portable telephone which has a selector device according to an embodiment of the present invention.

FIG. 1 is a block diagram illustrating a main portion of a portable telephone which has a selector device according to an embodiment of the present invention. Functions and manipulation methods associated with the selector device will be described below with reference to FIG. 1.

Referring specifically to FIG. 1, a manipulation panel 10 comprises a telephone directory key 15 for storing a plurality of telephone numbers and associated destination names in a memory; a clear key 16 for erasing the contents stored in the memory; a Japanese/English switching key 17 for setting whether Japanese characters or English characters are used for storing a destination name; a function key 18 used when a telephone directory is created by using a telephone directory function which permits storage of a plurality of telephone numbers and destination names; an UP key 19 and a DOWN key 20 as input means for moving UP (backwardly) or DOWN (forwardly) a marker 35 displayed at a storage location 31 on a display unit 30, in addition to keys for basic functions as a telephone such as a power key 11 for powering ON/OFF the portable telephone; a call key 12 serving as a decision input means which is pressed upon transmission or reception; a hold button 13 for temporarily holding an incoming call; numeral keys 14; and so on.

The output of the manipulation panel 10 is supplied to a microcomputer 21. The microcomputer 21 displays the contents of a manipulation on the manipulation panel 10 and a reception condition when a call is received on the display unit 30, and stores the contents of manipulations in a memory 22. Also, the microcomputer 21 controls an audio controller 24 as required to output a voice or sound from a speaker 23 which functions as a sound generating means or a sound generating body, not shown. The memory 22 previously contains programs such as procedure flows executed by the microcomputer 21 for performing registration, change and deletion of a number, a procedure flow for placing a call from the telephone to a registered telephone number, and so on, and has individual storage locations which are set for storing a plurality of telephone numbers and destination names. In addition, the memory 22 stores data for specifying a sound within a musical scale from "do" to "si" in the order of memory addresses corresponding to the respective storage locations.

The numeral keys 14 on the manipulation panel 10 each have imprinted in the respective surface thereof a Japanese character "Kana" and English characters in a predetermined display method, in addition to a numeral "1"–"0" typically displayed thereon, for registering telephone numbers and destination names associated therewith in a telephone directory. For example, a "1" key within the numeral keys 14 is imprinted with a Japanese Kana character " " and English characters "A–E" in addition to the character "1." When a destination name is stored in the telephone directory, it is possible to select whether it is displayed in Japanese Kana characters or in English characters by pressing the Japanese/English switching key 17.

FIGS. 2 and 3 are tables which show in matrix form the relationships of Japanese Kana characters and English characters entered through manipulations on the numeral keys 14, respectively. Specifically, FIG. 2 shows the relationship between Japanese Kana characters and the numeral keys 14, and FIG. 3 shows the relationship between English characters and the numeral keys 14, wherein one Japanese Kana character or one English character is set by two numbers. For example, when "Yuki," which is the name of a destination, is entered in Japanese Kana characters (, (yu) can be displayed on the display unit 30 by sequentially pressing "8" and "2" of the numeral keys 14 since the Japanese Kana character " " (yu) is positioned at the intersection of the eighth row and the second column in the table, as shown in FIG. 2. In this way, for entering "Yuki" in Japanese Kana characters (, "8," "2," "2," "2" are sequentially pressed on the numeral keys 14 to display " " on the display unit 30. The corresponding English characters can be entered in a similar manner. Subsequently, the entered characters can be stored in the memory 22 by a predetermined manipulation.

The display unit 30 displays the contents stored in the memory 22 corresponding to storage locations, in addition to displays such as figures or the like indicative of reception conditions and a variety of functions. For example, when the telephone directory key 15 is pressed, destination names and telephone numbers registered in the telephone directory are displayed in the order of storage locations in the memory 22, or in the order of memory addresses in this example, as shown in FIG. 4. On the display unit 30, columns (display positions) are previously set in accordance with the contents to be displayed. Specifically, a storage location column 31 displays numbers 1–n (n is a positive integer) corresponding to storage locations in the memory 22 below the title "NO."; a name column 32 displays destination names below the title "NAME"; and a telephone number column 33 displays telephone numbers below the title "TELEPHONE NUMBER," respectively. In addition, a guide column 34 displays the number of telephone numbers registered in the telephone directory or the like. Since the display unit 30 has a small display area, the display unit 30 displays every two of stored contents at respective storage locations in the memory 22.

The displayed contents on the display unit 30 can be scrolled backwardly and forwardly through manipulations on the UP/DOWN keys 19, 20. A marker 35 is provided on the storage location column 31 of the display unit 30 for indicating a selected storage location. The marker 35 is first displayed at a storage location "1" and can be moved from "1" to "2" through a manipulation on the DOWN key 20. A further manipulation on the DOWN key 20 causes the display unit 30 to display stored contents at "3" and "4" and the marker 35 to be positioned on a storage location "3."

Also, when the UP key 19 is manipulated while the stored contents at "3" and "4" have been displayed with the marker 35 being positioned at "3," the stored contents "1" and "2" are displayed with the marker 35 positioned at "2." In other words, the display unit 30 always displays stored contents at two storage locations, and a storage location eventually selected with the marker 35 is regarded as a definite location, the contents of which may be subjected to registration into or deletion from the telephone directory, placement of a call, or the like, as will be later described.

The memory 22 previously stores musical scale data indicative of steps of one octave, i.e., do, re, mi, fa, sol, la, si for example, in correspondence to storage locations "1"–"7" in the order of the numbers, in addition to a plurality of destination names and telephone numbers, as shown in FIG. 5.

The music scale data refers to numerical values, for example, indicative of a frequency division ratio for generating the frequency of a desired step by dividing a system clock of the microcomputer 21; a sound generating time period, the number of sound generations; and so on. Alternatively, the music scale data may be numerical values indicative of a reading speed, instead of the division ratio, when a desired step is generated by changing the speed of reading waveform data of a musical instrument or the like.

As shown in FIG. 6, the music scale similarly has seven steps from "do" to "si" corresponding also to storage locations "8" to "14." In other words, "do" associated with the storage location "1" is the same as "do" associated with the storage location "8," thus repeating the seven steps every seven storage locations.

Alternatively, in this case, the second "do" associated with the storage location "8" may be replaced with "dodo" to generate "do" twice so as to facilitate the confirmation of the second "do" or the storage location "8."

Further alternatively, while this embodiment provides the music scale data for a total of 14 storage locations by repeating the same music scale twice, the number of repetitions may be set as appropriate. Also, sequential steps may be used over the entire storage locations.

The microcomputer 21 reads from the memory 22 the music scale data corresponding to a storage location indicated by the marker 35 displayed on the storage location column 31 of the display unit 30, and sends the read music scale data to the audio controller 24. The audio controller 24 generates a sound at a step indicated by this music scale data using a built-in divider and a waveform memory, not shown, and outputs the thus generated sound from the speaker 23. For example, when the telephone directory key 15 is pressed to display the contents shown in FIG. 4 on the display unit 30, the marker 35 is positioned on the storage location "1," so that the sound "do" corresponding to "1" is output. Next, as the DOWN key 20 is manipulated to move the marker 35 from "1" to "2," the sound "re" corresponding to "2" is generated. In this way, the selector device of the present invention is configured to output a sound from the speaker 23 corresponding to a storage location indicated by the marker 35 on the display unit 30 as the marker 35 is moved along the storage location column in a uniform order through manipulations of the UP/DOWN keys 19, 20 serving as input means.

Figure 7:
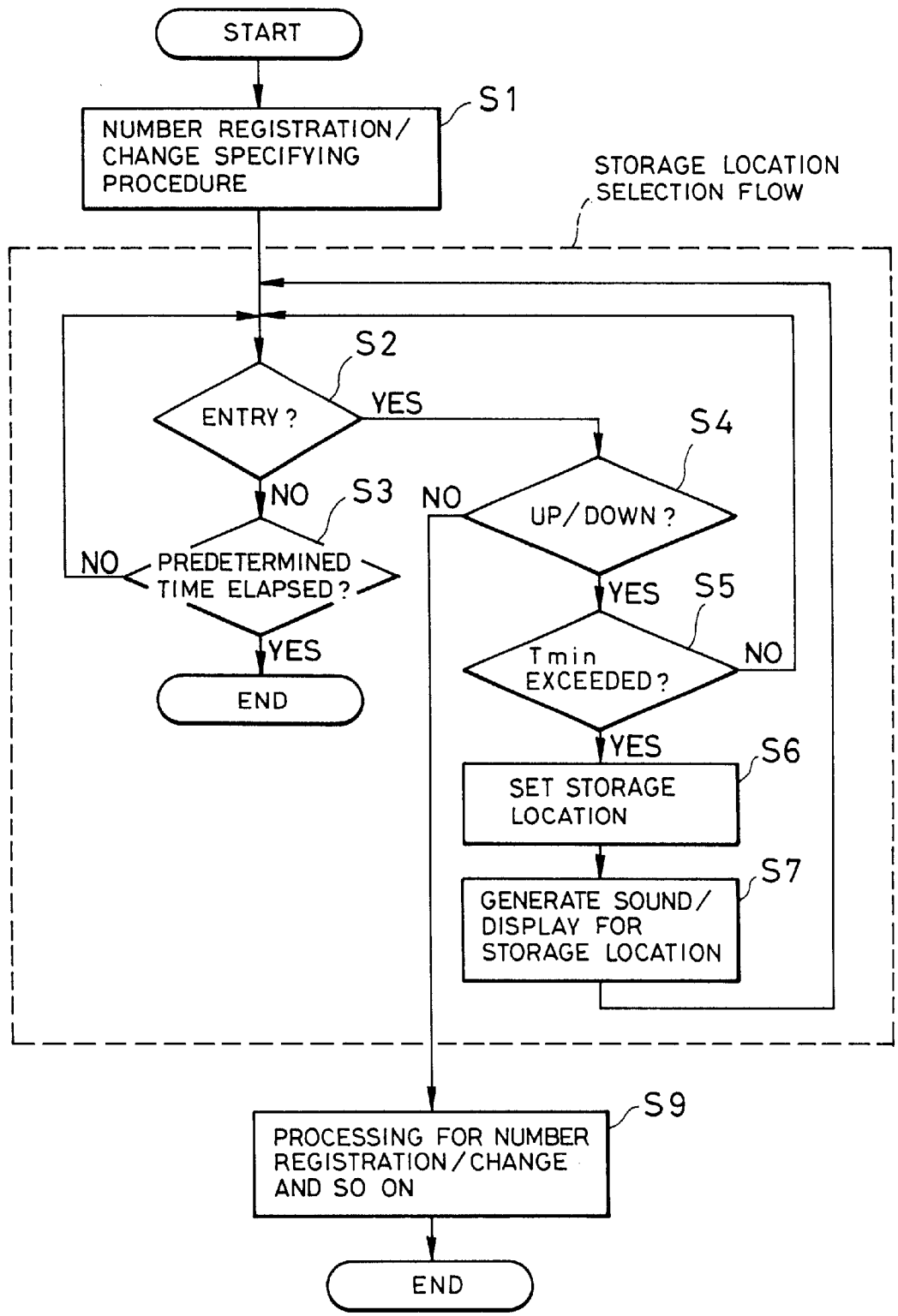
FIG. 7 is a flow diagram illustrating a number registration/change specifying mode of the selector device according to the present invention.

Now, a method of registering a telephone number and an associated destination name in the telephone directory will be explained with reference to a flow diagram of FIG. 7 which illustrates a number registration/change specifying procedure.

First, at step S1, as the operator performs a predetermined manipulation on the function key 18 or the like, the microcomputer 21 of the selector device enters a number registration/change specifying mode, wherein the marker 35 is displayed on the storage location "1" and the associated sound "do" is generated from the speaker 23. The display unit 30 displays two telephone numbers and associated destination names corresponding to the storage locations "1" and "2," as shown in FIG. 4. It should be noted that location numbers without registered telephone number and destination name are also displayed. The guide column 34 displays the number of previously registered telephone numbers, for example, as in the form of "NUMBER OF REGISTRATION: 5."

Next, at step S2, the microcomputer 21 monitors whether or not any key is pressed on the manipulation panel 10. When no key is pressed, the flow proceeds to step S3.

The microcomputer 21 is set to return to a reception waiting state when no key is manipulated on the manipulation panel 10 for a predetermined time period (for example, 10 seconds). Specifically, at step S3, the microcomputer 21 counts the time since no key has been pressed. When the counted value is within a predetermined time period, the flow returns to step S2 to continue the monitoring. Conversely, if the counted value exceeds the predetermined time period at step S3, the microcomputer 21 terminates the number registration/change specifying mode, and returns to the reception waiting state.

At the aforementioned step S2, when an entry is recognized, the flow proceeds to step S4, where it is determined whether the UP key 19 or the DOWN key 20 has been pressed. The flow proceeds to step S5 when either of these keys has been pressed, and to step S9 when neither of them has been pressed.

At step S5, the microcomputer 21 counts the time period from the time sound was generated at the most recent time (from the time at which the sound "do" was generated when this is the first time since the number registration/change specifying mode had been entered). The flow returns to step S2 when the monitored time period is less than a preset minimum time period (Tmin: for example, 0.2 seconds) to again monitor an entry. This operation is intended to generate every sound for not shorter than Tmin, such that the operator can hear the sound without fail.

Conversely, when the monitored time period exceeds Tmin at step S5, the flow proceeds to step S6.

At step S6, a storage location at which the marker 35 is displayed is set in accordance with whether the UP key 19 or the DOWN key 20 has been pressed, followed by the flow proceeding to step S7. In this event, when the UP key 19 is pressed with the marker 35 being displayed on the first storage location or "1," the marker 35 may be moved to the last storage location or "14" in this embodiment. Conversely, when the DOWN key 20 is pressed with the marker 35 being displayed on the last storage location or "14," the marker 35 may be moved to the first storage location or "1." In this way, the marker 35 may be moved in a cyclic manner. Alternatively, the marker 35 may be stick to the first or last storage location such that this storage location is repeatedly set.

At step S7, the microcomputer 21 issues a command to the display unit 30 to scroll the contents displayed on the display unit 10 as required such that the stored contents at the set storage location are displayed, and to display the marker 35 at the set storage location. The display unit 30 responsively displays as commanded. Simultaneously, the microcomputer 21 issues a command to the audio controller 25 to output a sound at a step corresponding to the storage location from the speaker 23. The audio controller 24 generates the sound at the specified step for a predetermined time period (T: for example, one second) in response to this command. If the audio controller 24 receives a new command before the predetermined time period (T) expires, the audio controller 24 interrupts the generation of the so far generated sound, and generates a sound based on the new command again for the predetermined time period (T).

After issuing the commands to the display unit 30 and the audio controller 24, the microcomputer 21 immediately returns to step S2 to monitor an entry.

In the manner described above, as the UP key 19 or the DOWN key 20 is sequentially manipulated, steps S2, S4, S5, S6, S7 are repeatedly executed such that the operator can select a desired storage location while confirming corresponding sounds and displays.

At step S9, the microcomputer 21 executes processing in accordance with a key determined at step S4. For example, when the clear key 16 is pressed, the microcomputer 21 terminates the number registration/change specifying mode. On the other hand, when the function key 18 is pressed, the following procedure may be executed to register a destination name and an associated telephone number in the storage location selected as described above, or to change those previously registered therein with other ones.

Specifically, "NAME ?" is displayed in the guide column 34 of the display unit 30. The operator enters appropriate characters indicative of the name of a destination by the aforementioned method. As the operator eventually presses the function key 18, the registration of the destination name is completed. Next, "TELEPHONE NUMBER ?" is displayed in the guide column 34 of the display unit 30. The operator presses numeral keys 14 to enter a telephone number. As the operator eventually presses the function key 18, the registration of the telephone number is completed, thus terminating step S9.

In the foregoing procedure, when the name column 32 or the telephone number column 33 has been blank from the beginning, new registration is performed. Conversely, when a certain destination name and/or telephone number have already been stored in these columns, the stored destination name and/or telephone number are changed. Also, when previously stored destination name and/or telephone number are deleted, the stored characters may be entirely overwritten by blanks. When the clear key 17 is pressed upon proceeding to step S9, "Delete ?" is displayed in the guide column 34 of the display unit 30. By additionally pressing the function key 18, the stored contents at a storage location indicated by the marker 35 are collectively deleted. When the stored contents are deleted, the contents so far stored at the storage location do disappear, whereas the number of the storage location and the associated sound are held as they are, for example, as shown at the storage location "4" in FIG. 5. In other words, stored contents at lower storage locations are not carried upward.

After step S9 is completed, the microcomputer 21 may immediately return to the reception waiting state, or may make a display to allow the operator to select whether or not another registered number is changed in continuation, such that the flow returns to step S2 when the operator desires to change another registered number.

Figure 8:
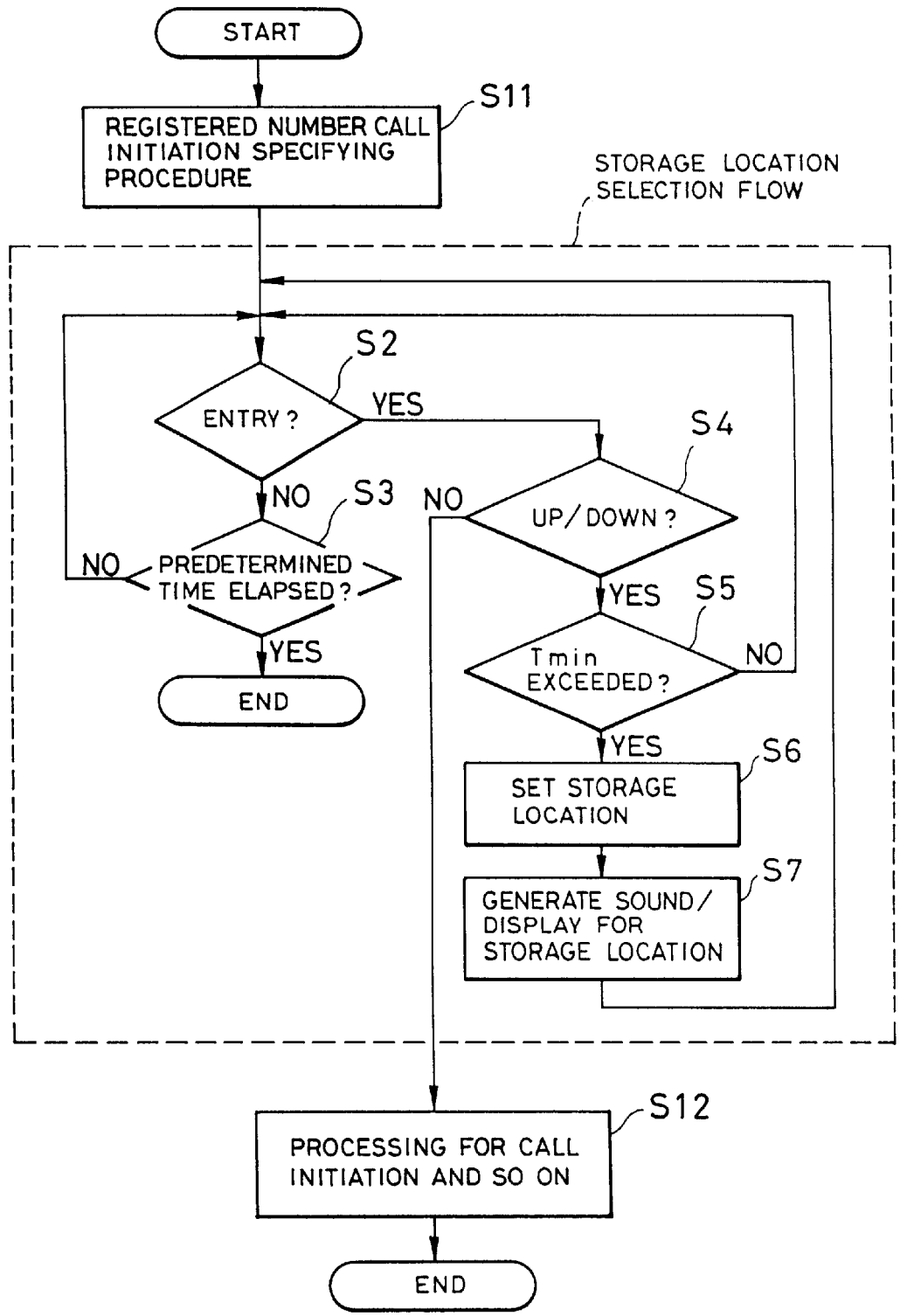
FIG. 8 is a flow chart illustrating a registered number call initiation specifying mode of the selector device according to the present invention.

Next, a method of calling up a telephone number and an associated destination name stored in the telephone directory to place a call thereto will be explained with reference to a flow diagram of FIG. 8 which illustrates a registered number call initiation specifying procedure.

First, at step S11, as the operator presses the telephone directory key 15, the microcomputer 21 of the selector device enters a registered number call initiation specifying mode, wherein the marker 35 is displayed on the storage location "1" and the associated sound "do" is generated from the speaker 23. The display unit 30 displays, as shown in FIG. 5, two telephone numbers and associated destination names corresponding to the storage locations "1" and "2" and, displays, for example, "TO WHICH TO CALL ?" in the guide column 34.

Next, a processing flow for selecting a storage location is executed in a manner similar to the aforementioned number registration/change specifying mode. Since steps involved in this processing flow, i.e., steps S2 to step S7, the range of which is indicated by broken lines, are identical to those in FIG. 7, repetitive explanation is omitted.

In this registered number call initiation specifying procedure, when nether the UP key 19 nor the DOWN key 20 is pressed at step S4, the flow proceeds to step S12.

At step S12, processing in accordance with a key determined at step S4 is performed. For example, when the clear key 16 is determined, the registered number call initiation mode is terminated. On the other hand, when the call key 12 is determined, the mobile telephone is set in a call mode. The microcomputer 21 reads a telephone number corresponding to a selected storage location from the memory 22, converts the telephone number to a DTMF signal, and commands the mobile telephone to place a call, thus terminating a sequence of operations.

As described above, according to the foregoing embodiment, when the operator registers destination names in the telephone directory, the operator does not simply register them in the order of storage locations in sequence, but can preferentially register more frequently called destinations at upper locations, as shown in FIG. 5, and register destination names associated with sounds, for example, setting the sound "so" to a "direct telephone number" at his office, setting the second "do" to a "friend," or the like. Thus, upon placing a call, the operator can specify a destination only with the sound associated therewith. For example, when the operator has difficulties in viewing the display unit 30, in such a situation that he is in a dark place or he is walking, the operator can recognize a destination only with a sound which is generated with a manipulation on the UP key 19 or the DOWN key 20. In addition, even a visually handicapped person can readily place a call.

In the foregoing embodiment, the sound corresponding to each storage location is described as a previously stored "music scale" which is the simplest form of melody. Alternatively, the operator may be allowed to create sounds associated with respective storage locations. In this case, numerical values indicative of a preset step (sound name) and the length of sound may be entered together with a number indicative of each storage location, to set a sound corresponding to each storage location.

In this case, a simple combination of sounds, for example, "do, re, re," "re, do, do" or the like may be set instead of a single sound. In essence, the type of sound is not limited as long as sounds sequentially generated from the first one can be readily distinguished by the operator.

While the foregoing embodiment has been described for a telephone directory function in a mobile telephone as an example in which the selector device of the present invention is implemented, the present invention may also be applied to a family use telephone, facsimile or the like, and further to a selector device such as a remote controller or the like of audio-visual equipment. For example, instead of directly pressing channel number keys on a remote controller of a television, a channel can be selected using UP/DOWN keys while confirming respective channels with corresponding sounds, thereby facilitating the channel selection without viewing a selected channel number displayed on the screen of the television or the like.

While the foregoing embodiment has shown UP/DOWN keys as exemplary input means, it goes without saying that a jog dial, a mouse or the like may be used instead.

As described above, according to the selector device of the present invention, a target storage location can be readily selected through sequentially generated sounds.

What is claimed is:

1. A selector device comprising:
    a memory for storing stored information respectively at a plurality of storage locations thereof, and for storing specifying information for specifying a sound particular to each storage location;
    input means for specifying said storage locations in a uniform order;
    sound generating means for sequentially generating said sounds particular to said storage locations in said order in response to manipulations on said input means; and
    decision input means for deciding a storage location corresponding to a lastly generated sound.

2. A selector device according to claim 1, further comprising reading means for reading stored information stored at said decided storage location for utilization.

3. A selector device according to claim 2, further comprising input means for performing at leaset one of operations of registering new information at said decided storage location, updating stored information at said decided storage location, and deleting stored information at said decided storage location.

4. A selector device according to claim 3, wherein each of said sounds generated in said uniform order forms a melody.

5. A selector device according to claim 4, further comprising display means for displaying or indicating at least a portion of said stored information together with the generation of said sound.

6. A selector device according to claim 5, wherein said storage locations can be specified backwardly by said input means.

7. A selector device according to claim 4, wherein said storage locations can be specified backwardly by said input means.

8. A selector device according to claim 3, further comprising display means for displaying or indicating at least a portion of said stored information together with the generation of said sound.

9. A selector device according to claim 8, wherein said storage locations can be specified backwardly by said input means.

10. A selector device according to claim 3, wherein said storage locations can be specified backwardly by said input means.

11. A selector device according to claim 2, wherein each of said sounds generated in said uniform order forms a melody.

12. A selector device according to claim 11, further comprising display means for displaying or indicating at least a portion of said stored information together with the generation of said sound.

13. A selector device according to claim 12, wherein said storage locations can be specified backwardly by said input means.

14. A selector device according to claim 11, wherein said storage locations can be specified backwardly by said input means.

15. A selector device according to claim 2, further comprising display means for displaying or indicating at least a portion of said stored information together with the generation of said sound.

16. A selector device according to claim 15, wherein said storage locations can be specified backwardly by said input means.

17. A selector device according to claim 2, wherein said storage locations can be specified backwardly by said input means.

18. A selector device according to claim 1, further comprising input means for performing at leaset one of operations of registering new information at said decided storage location, updating stored information at said decided storage location, and deleting stored information at said decided storage location.

19. A selector device according to claim 18, wherein each of said sounds generated in said uniform order forms a melody.

20. A selector device according to claim 19, further comprising display means for displaying or indicating at least a portion of said stored information together with the generation of said sound.

21. A selector device according to claim 20, wherein said storage locations can be specified backwardly by said input means.

22. A selector device according to claim 19, wherein said storage locations can be specified backwardly by said input means.

23. A selector device according to claim 18, further comprising display means for displaying or indicating at least a portion of said stored information together with the generation of said sound.

24. A selector device according to claim 23, wherein said storage locations can be specified backwardly by said input means.

25. A selector device according to claim 18, wherein said storage locations can be specified backwardly by said input means.

26. A selector device according to claim 1, wherein each of said sounds generated in said uniform order forms a melody.

27. A selector device according to claim 5, further comprising display means for displaying or indicating at least a portion of said stored information together with the generation of said sound.

28. A selector device according to claim 27, wherein said storage locations can be specified backwardly by said input means.

29. A selector device according to claim 26, wherein said storage locations can be specified backwardly by said input means.

30. A selector device according to claim 1, further comprising display means for displaying or indicating at least a portion of said stored information together with the generation of said sound.

31. A selector device according to claim 30, wherein said storage locations can be specified backwardly by said input means.

32. A selector device according to claim 1, wherein said storage locations can be specified backwardly by said input means.

* * * * *